United States Patent
Niwa

(10) Patent No.: US 8,838,502 B2
(45) Date of Patent: Sep. 16, 2014

(54) METHOD OF USING PERSONAL DEVICE WITH INTERNAL BIOMETRIC IN CONDUCTING TRANSACTIONS OVER A NETWORK

(75) Inventor: Kiyohiko Niwa, Haworth, NJ (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 191 days.

(21) Appl. No.: 13/443,303

(22) Filed: Apr. 10, 2012

(65) Prior Publication Data

US 2012/0197808 A1 Aug. 2, 2012

Related U.S. Application Data

(60) Division of application No. 10/207,529, filed on Jul. 29, 2002, now Pat. No. 8,219,495, which is a continuation of application No. 09/510,811, filed on Feb. 23, 2000, now Pat. No. 6,453,301.

(51) Int. Cl.
*G06Q 20/00* (2012.01)
*G06Q 20/08* (2012.01)
*G06Q 30/06* (2012.01)
*G06Q 20/20* (2012.01)
*G06Q 20/38* (2012.01)
*G06Q 20/40* (2012.01)
*G06Q 20/36* (2012.01)

(52) U.S. Cl.
CPC ............ *G06Q 30/06* (2013.01); *G06Q 20/0855* (2013.01); *G06Q 30/0637* (2013.01); *G06Q 20/206* (2013.01); *G06Q 20/382* (2013.01); *G06Q 20/401* (2013.01); *G06Q 20/367* (2013.01); *G06Q 20/204* (2013.01); *Y10S 902/03* (2013.01)
USPC ........... 705/65; 705/18; 705/78; 726/5; 902/3

(58) Field of Classification Search
USPC .......................................................... 705/65
See application file for complete search history.

(56) References Cited

U.S. PATENT DOCUMENTS 4,582,985 A 4/1986 Lofberg
4,766,293 A 8/1988 Boston (Continued)

FOREIGN PATENT DOCUMENTS

EP 0917119 A2 5/1999
EP 0949595 A2 10/1999

(Continued)

OTHER PUBLICATIONS

"Ethenticator MS 3000" product page from ethentica.com. Observed by the Internet Archive on Aug. 15, 2000 (2 pages) http://web.archive.org/web/20000815235523/www.ethentica.com/ms3000.pdf.

(Continued)

*Primary Examiner* — Jamie Kucab
(74) *Attorney, Agent, or Firm* — John P. O'Banion; Noelle L. Cacciabeve

(57) ABSTRACT

A method of authorizing a commercial transaction between a customer and a provider of goods or services over a network, wherein the provider of goods or services requests that the customer provide authentication by activating a fingerprint identification device, and the provider of goods or services receives at least an authentication code of the customer over the network from the fingerprint identification device, the method comprising the steps of: providing the customer with the fingerprint identification device which produces the authentication code when a fingerprint of the customer matches a stored fingerprint within the fingerprint identification device; receiving at least the authentication code from the provider of goods or services over the network; and authorizing the transaction if at least the authentication code is valid.

13 Claims, 6 Drawing Sheets

(56) References Cited

U.S. PATENT DOCUMENTS

| | | | |
|---|---|---|---|
| 4,805,222 | A | 2/1989 | Young et al. |
| 4,816,653 | A | 3/1989 | Anderl et al. |
| 5,056,019 | A | 10/1991 | Schultz et al. |
| 5,131,038 | A | 7/1992 | Puhl et al. |
| 5,173,851 | A | 12/1992 | Off et al. |
| 5,221,838 | A | 6/1993 | Gutman et al. |
| 5,256,863 | A | 10/1993 | Ferguson et al. |
| 5,276,736 | A | 1/1994 | Chaum |
| 5,280,527 | A | 1/1994 | Gullman et al. |
| 5,323,146 | A | 6/1994 | Glaschick et al. |
| 5,329,589 | A | 7/1994 | Fraser et al. |
| 5,436,972 | A | 7/1995 | Fischer |
| 5,457,747 | A | 10/1995 | Drexler et al. |
| 5,461,217 | A | 10/1995 | Claus |
| 5,475,758 | A | 12/1995 | Kikuchi et al. |
| 5,521,362 | A | 5/1996 | Powers |
| 5,521,890 | A | 5/1996 | Miche et al. |
| 5,537,314 | A | 7/1996 | Kanter |
| 5,545,139 | A | 8/1996 | Kriesel |
| 5,550,358 | A | 8/1996 | Tait et al. |
| 5,557,518 | A | 9/1996 | Rosen |
| 5,557,541 | A | 9/1996 | Schulhof et al. |
| 5,561,709 | A | 10/1996 | Remillard |
| 5,594,230 | A | 1/1997 | Waite et al. |
| 5,598,474 | A * | 1/1997 | Johnson ............... 713/186 |
| 5,604,805 | A | 2/1997 | Brands |
| 5,615,277 | A | 3/1997 | Hoffman |
| 5,623,552 | A | 4/1997 | Lane |
| 5,650,761 | A | 7/1997 | Gomm et al. |
| 5,661,807 | A | 8/1997 | Guski et al. |
| 5,696,827 | A | 12/1997 | Brands |
| 5,710,887 | A | 1/1998 | Chelliah et al. |
| 5,712,913 | A | 1/1998 | Chaum |
| 5,734,838 | A | 3/1998 | Robinson et al. |
| 5,737,701 | A | 4/1998 | Rosenthal et al. |
| 5,744,787 | A | 4/1998 | Teicher |
| 5,748,737 | A | 5/1998 | Daggar |
| 5,761,308 | A | 6/1998 | Torii et al. |
| 5,778,068 | A | 7/1998 | Johnson et al. |
| 5,778,384 | A | 7/1998 | Provino et al. |
| 5,796,832 | A | 8/1998 | Kawan |
| 5,809,212 | A | 9/1998 | Shasha |
| 5,815,665 | A | 9/1998 | Teper et al. |
| 5,825,876 | A | 10/1998 | Peterson, Jr. |
| 5,838,812 | A | 11/1998 | Pare, Jr. et al. |
| 5,841,871 | A | 11/1998 | Pinkas et al. |
| 5,856,659 | A | 1/1999 | Drupsteen et al. |
| 5,870,723 | A | 2/1999 | Pare, Jr. et al. |
| 5,878,138 | A | 3/1999 | Yacobi |
| 5,878,139 | A | 3/1999 | Rosen |
| 5,878,235 | A | 3/1999 | Porterfield et al. |
| 5,884,271 | A | 3/1999 | Pitroda |
| 5,884,272 | A | 3/1999 | Walker et al. |
| 5,887,140 | A | 3/1999 | Itsumi et al. |
| 5,892,900 | A | 4/1999 | Ginter et al. |
| 5,897,622 | A | 4/1999 | Blinn et al. |
| 5,903,721 | A | 5/1999 | Sixtus |
| 5,915,022 | A | 6/1999 | Robinson et al. |
| 5,917,913 | A | 6/1999 | Wang |
| 5,923,016 | A | 7/1999 | Fredregill et al. |
| 5,926,624 | A | 7/1999 | Katz et al. |
| 5,926,798 | A | 7/1999 | Carter et al. |
| 5,936,220 | A | 8/1999 | Hoshino et al. |
| 5,943,423 | A | 8/1999 | Muftic |
| 5,945,652 | A | 8/1999 | Ohki et al. |
| 5,948,040 | A | 9/1999 | DeLorme et al. |
| 5,949,411 | A | 9/1999 | Doerr et al. |
| 5,956,699 | A | 9/1999 | Wong et al. |
| 5,960,411 | A | 9/1999 | Hartman et al. |
| 5,966,704 | A | 10/1999 | Furegati et al. |
| 5,987,134 | A | 11/1999 | Shin et al. |
| 5,990,804 | A | 11/1999 | Koyama |
| 6,000,832 | A | 12/1999 | Franklin et al. |
| 6,002,770 | A | 12/1999 | Tomko et al. |
| 6,002,787 | A * | 12/1999 | Takhar et al. ............... 382/125 |
| 6,003,014 | A | 12/1999 | Lee et al. |
| 6,006,200 | A | 12/1999 | Boies et al. |
| 6,009,415 | A | 12/1999 | Shurling et al. |
| 6,012,039 | A | 1/2000 | Hoffman et al. |
| 6,014,636 | A | 1/2000 | Reeder |
| 6,016,476 | A | 1/2000 | Maes et al. |
| 6,018,724 | A | 1/2000 | Arent |
| 6,021,496 | A | 2/2000 | Dutcher et al. |
| 6,023,679 | A | 2/2000 | Acebo et al. |
| 6,026,491 | A | 2/2000 | Hiles |
| 6,029,150 | A | 2/2000 | Kravitz |
| 6,035,403 | A | 3/2000 | Subbiah et al. |
| 6,047,268 | A | 4/2000 | Bartoli et al. |
| 6,047,269 | A | 4/2000 | Biffar |
| 6,073,124 | A | 6/2000 | Krishnan et al. |
| 6,076,075 | A | 6/2000 | Teicher et al. |
| 6,076,167 | A | 6/2000 | Borza et al. |
| 6,078,891 | A | 6/2000 | Riordan et al. |
| 6,085,178 | A | 7/2000 | Bigus et al. |
| 6,088,731 | A | 7/2000 | Kiraly et al. |
| 6,105,010 | A | 8/2000 | Musgrave |
| 6,108,644 | A | 8/2000 | Goldschlag et al. |
| 6,119,096 | A | 9/2000 | Mann et al. |
| 6,122,737 | A | 9/2000 | Bjorn et al. |
| 6,128,602 | A | 10/2000 | Northington et al. |
| 6,129,274 | A | 10/2000 | Suzuki |
| 6,138,911 | A | 10/2000 | Fredregill et al. |
| 6,141,754 | A | 10/2000 | Choy |
| 6,148,241 | A | 11/2000 | Ludtke et al. |
| 6,151,600 | A | 11/2000 | Dedrick |
| 6,163,772 | A | 12/2000 | Kramer et al. |
| 6,167,517 | A | 12/2000 | Gilchrist et al. |
| 6,174,124 | B1 | 1/2001 | Smith et al. |
| 6,182,076 | B1 | 1/2001 | Yu et al. |
| 6,226,618 | B1 | 5/2001 | Downs et al. |
| 6,243,689 | B1 * | 6/2001 | Norton ............... 705/18 |
| 6,260,021 | B1 | 7/2001 | Wong et al. |
| 6,263,446 | B1 * | 7/2001 | Kausik et al. ............... 726/5 |
| 6,269,348 | B1 | 7/2001 | Pare, Jr. et al. |
| 6,270,011 | B1 | 8/2001 | Gottfried |
| 6,279,112 | B1 | 8/2001 | O'Toole, Jr. et al. |
| 6,282,653 | B1 | 8/2001 | Berstis et al. |
| 6,289,323 | B1 | 9/2001 | Gordon et al. |
| 6,310,966 | B1 | 10/2001 | Dulude et al. |
| 6,314,196 | B1 | 11/2001 | Yamaguchi et al. |
| 6,353,811 | B1 | 3/2002 | Weissman |
| 6,356,905 | B1 | 3/2002 | Gershman et al. |
| 6,366,953 | B2 | 4/2002 | Inoue |
| 6,370,629 | B1 | 4/2002 | Hastings et al. |
| 6,434,535 | B1 | 8/2002 | Kupka et al. |
| 6,442,692 | B1 | 8/2002 | Zilberman |
| 6,453,301 | B1 | 9/2002 | Niwa |
| 6,487,662 | B1 | 11/2002 | Kharon et al. |
| 6,502,748 | B2 * | 1/2003 | Berg et al. ............... 235/379 |
| 6,529,885 | B1 | 3/2003 | Johnson |
| 6,556,976 | B1 | 4/2003 | Callen |
| 6,560,741 | B1 | 5/2003 | Gerety et al. |
| 6,574,607 | B1 | 6/2003 | Carter et al. |
| 6,578,014 | B1 | 6/2003 | Murcko, Jr. |
| 6,592,044 | B1 | 7/2003 | Wong et al. |
| 6,615,264 | B1 | 9/2003 | Stoltz et al. |
| 6,655,585 | B2 | 12/2003 | Shinn |
| 6,662,166 | B2 | 12/2003 | Pare, Jr. et al. |
| 6,687,390 | B2 | 2/2004 | Avni et al. |
| 6,695,207 | B1 * | 2/2004 | Norris, Jr. ............... 235/382 |
| 6,871,287 | B1 | 3/2005 | Ellingson |
| 6,910,132 | B1 | 6/2005 | Bhattacharya |
| 6,941,462 | B1 * | 9/2005 | Tsukamura et al. ............... 713/186 |
| 6,968,453 | B2 | 11/2005 | Doyle et al. |
| 6,970,836 | B1 * | 11/2005 | Paltenghe et al. ............... 705/18 |
| 7,003,495 | B1 | 2/2006 | Burger et al. |
| 7,124,300 | B1 | 10/2006 | Lemke |
| 7,181,297 | B1 | 2/2007 | Pluvinage et al. |
| 7,188,110 | B1 | 3/2007 | Ludtke et al. |
| 7,251,633 | B2 | 7/2007 | Ludtke et al. |
| 7,284,266 | B1 | 10/2007 | Morris et al. |
| 7,565,541 | B1 | 7/2009 | Tarbouriech |
| 7,613,659 | B1 | 11/2009 | Hoffman et al. |
| 2001/0045458 | A1 | 11/2001 | Polansky |

(56) References Cited

U.S. PATENT DOCUMENTS

| | | | |
|---|---|---|---|
| 2001/0449061 | | 11/2001 | Kanevsky et al. |
| 2001/0051996 | A1 | 12/2001 | Cooper et al. |
| 2002/0123967 | A1 | 9/2002 | Wang |
| 2002/0123971 | A1 | 9/2002 | Maritzen et al. |
| 2002/0128980 | A1 | 9/2002 | Ludtke et al. |
| 2002/0147914 | A1 | 10/2002 | Arnold |
| 2002/0191816 | A1 | 12/2002 | Maritzen et al. |
| 2004/0044627 | A1 | 3/2004 | Russell et al. |
| 2004/0177097 | A1 | 9/2004 | Yu et al. |
| 2004/0199469 | A1 | 10/2004 | Barillova et al. |

FOREIGN PATENT DOCUMENTS

| | | | |
|---|---|---|---|
| EP | 1 033 687 | A2 | 9/2000 |
| EP | 1 085 424 | A1 | 3/2001 |
| JP | 3060424 | A | 3/1991 |
| JP | 9722857 | | 2/1997 |
| JP | 10240691 | A | 9/1998 |
| JP | 11501423 | T | 2/1999 |
| JP | 9978521 | | 3/1999 |
| JP | 11096363 | A | 4/1999 |
| JP | 99164179 | | 6/1999 |
| JP | 11345266 | A | 12/1999 |
| TW | 351799 | | 2/1999 |
| TW | 87107650 | | 2/1999 |
| WO | 95/13591 | | 5/1995 |
| WO | 9618162 | A1 | 6/1996 |
| WO | 99/06928 | | 2/1999 |
| WO | 9908217 | A1 | 2/1999 |
| WO | 9921321 | A1 | 4/1999 |
| WO | 01/08055 | A1 | 2/2001 |
| WO | 01/22351 | A1 | 3/2001 |
| WO | 01/50428 | A1 | 7/2001 |
| WO | 01/59732 | A2 | 8/2001 |
| WO | 2005/033830 | | 4/2005 |

OTHER PUBLICATIONS

"Expansion Packs" product page from compaq.com Observed by the Internet Archive on Aug. 15, 2000 (2 pages) http://web.archive.org/web/20000815202017/www.compaq.com/products/handhelds/pocketpc/jackets.html.

"Microsoft Introduces DirectX for Windows CE" Published Feb. 29, 2000 (2 pages) http://www.microsoft.com/presspass/press/2000/feb00/dxpackpr.mspx.

"Multimedia Streaming on Microsoft Windows CE 3.0" © 2000 Microsoft Corporation (Jun. 2000 (8 pages) http://msdn.microsoft.com/en-us/library/ms834433.aspx.

"Musicbank and Sony Music Entertainment Ink Licensing Agreement". @Oct. 30, 2000 Musicbank.com Archived at http:/Mebarchive.orgtweb/20001210002400/www.musicbank.com/pr6.html.

"My.MP3.com—Help" Publication date of Nov. 9, 2000 as verified by the Internet Archive (2 pages) http://web.archive.org/web/200011090135/http://help.mp3.com/help/mymp3/tutorial/page2.html.

"Pocket PC User's Guide" © 2000 Casio Computer Co., LTD. (67 pages) http://ftp.casio.co.jp/pub/world_manual/ce/en/e115/e115ug.pdf.

Beam-itTM: Adding music from your CD collection to My.MP3.com is easy Publication date of Mar. 1, 2000 as verified by the Internet Archive (2 pages) http://web.archive.org/web/20000301100556/http://www.mp3.com/my/beamit/index.html.

Borland, John. "Sprint POS unveils wireless MP3 ambitions" @Oct. 31, 2000 CNET Networks Inc. http://news.com.com/2102-1033_3-247916html?tag=st.util.print.

Co-pending U.S. Appl. No. 09/466,965, Authentication System, Fingerprint Identification Unit, and Authentication Method, filed Dec. 20, 1999.

Crawford, Sharon, "Windows 2000 Pro: The Missing Manual" © 2000 O'Reilly Media Inc. Excerpts from Chapters 9 & 13 (32 pages total).

Delio, Michelle. "PC Expo: It's All About the Hand". Published Jun. 27, 2000 by wired.com (2 pages) http://www.wired.com/print/science/discoveries/news/2000/06/37266.

Drury; Demand Jumps for High-Tech ID Producer; Business First; Oct. 22, 2001; vol. 18, No. 3, p. 1.

Hacker, Scot. "MP3: The Definitive Guide" © 2000 O'Reilly Media Inc. Excerpt from Chapter 8 (pp. 271-277).

Hacker, Scot. "MP3: The Definitive Guide" © 2000 O'Reilly Media Inc. Excerpt from Chapter 6, pp. 201 and 220-224 (7 pages total).

Harmon, Amy. "Deal Settles Suit Against MP3.com" @Nov. 15, 2000 New York Times Company. http:/www nytimes.corril2000/11/15/technology/i 5MUSI. html?ex=i 1 27275200&en843336327cff1333&ei=5070&printpage=yes.

Heltzel, Paul. "Access your CDs anywhere" @Oct. 18, 1999 CNN,com http://www.cnn.com/TECH/computing/9910/18/cds.anywhere.idg.

John Borland, The Latest in Anti-piracy Efforts: Keystroke Recognition, http://news.cnet.com/news/0-1005-202-2066437.html, pp. 1-2 (dated Jun. 13, 2000).

Kevin Featherly, Can Typing Style 'ID' Thwart Online Music Piracy?, http://www.ecommercetimes.com/news/articles2000/000613-nb1.shtml, pp. 1-5 (dated Jun. 13, 2000).

King, Brad. "MP3.com Lets Streams Flow". © 2000 Wired News/Lycos Inc. http:f/wired-vig.wired, com/newsfprint/O, 1294,40536,00.html.

King, Brad. "Under the Influence: Majors control Licensing, therefore control music streaming services" © 2001 Variety.com http://www.variety.com/article/VR1 1 17792024?categoryid=16&cs=1&s=h&p=0.

McKendrick, Joseph, Creating a Password for Life from the Tip of a Finger, Nov. 3, 1999, ent, v4, n19, p. 22.

Music to be Protected by BioPassword, http://hitsquad.com/smm/news/275/, pp. 1-3 (dated Jun. 15, 2000)?.

MyPlay.com: "Play your music" Published May 11, 2000 as verified by the Internet Archive. http://web.archive.org/web/20000511000039/www.myplay.com/corp/tour_play. html.

Myplay.com: "The Free myplay DropBox". Published Feb. 8, 2001 as verified by the Internet ArChive. http://web.archive.org/web/200102081> 00057www.myplay.com/mp/1ocker/client.jsp.

Net Nanny Licenses Biopassword® to Musicrypt.com, Provides Biometric Security for Digital Music Transactions, http://www.netnanny.com/press/press_20000612.htm, pp. 1-3 (dated Jun. 12, 2000).

Office Action from corresponding Japanese Application No. 2001-562427 dated Dec. 13, 2010.

Office Action from corresponding Japanese Application No. 2001-562427 dated Jun. 14, 2010.

Pack: "Traditional Retailers Plan Interactive Stores", Orlando Sentinel, May 25, 1995.

Sommefeldt, Ryszard. "Compaq iPAQ H3630 PocketPC Review". Published Jan. 23, 2001 by hexus.net (7 pages) http://www.hexus.net/content/item_print.php?item=130.

Stephanie Izarek, Let's See Some ID, http://www.foxnews.com/vtech/122199/biometrics.sml, pp. 1-4 (dated Dec. 21, 1999).

U.S. Appl. No. 09/483,584, filed Dec. 11, 2000, entitled "Secure Electronic Commerce System".

U.S. Appl. No. 10/014,112, filed Dec. 11, 2001, entitled "System and Method for Conducting Secure Transactions Over a Network".

U.S. Appl. No. 10/014,960, filed Dec. 11, 2001, entitled "Method and System for Executing Deferred Transactions".

U.S. Appl. No. 10/015,070, filed Dec. 11, 2001, entitled "Method and System of Conducting Network-Based Transactions".

* cited by examiner

METHOD OF USING PERSONAL DEVICE WITH INTERNAL BIOMETRIC IN CONDUCTING TRANSACTIONS OVER A NETWORK

CROSS REFERENCE TO RELATED APPLICATIONS

The present application is a divisional of U.S. patent application Ser. No. 10/207,529, filed on Jul. 29, 2002, which is a continuation of U.S. patent application Ser. No. 09/510,811, filed Feb. 23, 2000, the entire disclosure of which is hereby incorporated by reference.

BACKGROUND OF THE INVENTION

The present invention relates to a method and system for authorizing a transaction between two parties over a network and, more particularly, to authorizing a transaction over the network when an authorization code has been received by an authorizing entity, the authorization code being produced by a fingerprint identification device in response to comparing a fingerprint of one of the parties to a stored fingerprint in the device.

As the use of networks, for example the Internet, become more prevalent, an ever expanding quantum of electronic commerce will be conducted between users over these networks. Typically, a consumer of goods and/or services electronically connects to a provider of goods and/or services over a network, for example, by way of a website. Using known website browser software, the consumer may review and select goods or services and request that such goods or services be delivered to a specified address.

The provider of goods or services, of course, expects to be paid for any goods or services requested by the consumer. Typically, this is accomplished by asking the consumer to enter his or her credit card number and expiration date. Sometime thereafter, and most likely after the consumer has disconnected from the provider's website, the provider telephones an authorizing entity (e.g., the originator or managing entity) of the credit card and requests authorization to complete the transaction. In particular, the provider of goods and/or services transmits the credit card number, expiration date, consumer name, and purchase amount to the authorizing entity and awaits authorization. The authorizing entity accesses the consumer's credit card account and verifies that the consumer is in good standing and that the purchase amount will not cause the consumer's credit balance to exceed his or her credit limit. If the authorizing entity's review of the consumer's credit account is favorable, then authorization is transmitted to the provider of goods and/or services to complete the transaction with the consumer.

As the provider of goods and/or services never actually sees the consumer and cannot assess the consumer in terms of whether or not the consumer is attempting to fraudulently utilize the credit card, both the provider of goods and/or services and the authorizing entity (originator of the credit card) must assume that the consumer is the authorized user of the credit card. It is only when the authorized user of a lost or stolen credit card calls the authorizing entity (or its representative) to report the lost and/or stolen card, that fraudulent uses of the credit card may be avoided.

Similar problems occur when goods and/or services are requested and confirmed by a user of the network simply by connecting with the provider's website. For example, when a provider of goods and/or services requires an initial registration with a particular consumer that authorizes billing the consumer for use of the website, accidental (or fraudulent) use of the website is likely by non-authorized users. More particularly, a parent (authorized user) may contract with a provider of goods and/or services to permit the authorized consumer to utilize the website. The terms of the contract (or registration) may be that the consumer's credit card will be charged for an amount representing use of the website by the authorized consumer (e.g., obtaining information from the website or purchasing goods). Unfortunately, the only way that the provider of goods and/or services knows that a user of the website is an authorized consumer is by way of an identification number (e.g., password etc.) given by the authorized consumer or automatically transmitted by the authorized consumer's personal computer. Thus, any user of the authorized consumer's personal computer who obtains the password (if employed) may access the website and incur charges without the knowledge of the authorized consumer.

Accordingly, there is a need in the art for a new method and system for facilitating and authorizing transactions between parties over a network which provides all parties to the transaction with confidence that the initiator of the transaction is authorized to enter into the transaction.

SUMMARY OF THE INVENTION

In order to overcome the disadvantages of the prior art, the present invention provides a method of conducting a commercial transaction between a customer and a provider of goods or services over a network. The method includes the steps of: providing the customer with a fingerprint identification device which produces an authentication code when a fingerprint of the customer matches a stored fingerprint within the fingerprint identification device; maintaining an electronic site on the network over which the customer may request goods or services from the provider of goods or services; requesting that the customer provide authentication by activating the fingerprint identification device; receiving at least the authentication code and a account number of the customer at the provider of goods or services over the network from the fingerprint identification device; transmitting the authentication code and the account number from the provider of goods or services to a managing entity of the account over the network in encrypted form, and requesting authorization to complete the transaction; and completing the transaction if the managing entity of the account provides the authorization.

Preferably, the stored fingerprint is in an encrypted format and at least one of the authentication code and account number are received over the network in an encrypted form.

The method of the present invention also contemplates permitting the customer to access the account. The steps according to this aspect of the invention include: establishing an electronic connection over the network between the customer and a managing entity of the account; requesting that the user provide authentication to the managing entity of the account by activating the fingerprint identification device; receiving at least the authentication code and the account number of the customer at the managing entity of the account over the network from the fingerprint identification device; and permitting access to the account if the authentication code is valid.

The customer is permitted to at least one of (i) transfer funds from the account; and (ii) deposit funds into the account, when the managing entity of the account has permitted access thereto.

According to another aspect of the invention, the customer is permitted access to an electronic safety deposit box. The steps according to this aspect of the invention further include establishing an electronic connection over the network between the customer and a managing entity of the electronic safety deposit box; requesting that the customer provide authentication to the managing entity of the electronic safety deposit box by activating the fingerprint identification device; receiving at least the authentication code at the managing entity of the electronic safety deposit box over the network from the fingerprint identification device; and permitting access to the electronic safety deposit box if at least the authentication code is valid.

According to yet another aspect of the invention, the customer is permitted to conduct an investment transaction over the network. The steps according to this aspect of the invention include: establishing an electronic connection over the network between the customer and a settlement bank over which the investor may provide investment instructions; requesting that the customer provide authentication to the settlement bank by activating the fingerprint identification device; receiving at least the authentication code at the settlement bank over the network from the fingerprint identification device; receiving investment instructions at the settlement bank over the network from the customer; and transmitting the investment instructions to a third party if at least the authentication code is valid.

Other objects, features, and advantages will become apparent to those skilled in the art in light of the description herein taken in conjunction with the accompanying drawing.

BRIEF DESCRIPTION OF THE DRAWINGS

For the purposes of illustrating the invention, there are shown in the drawings forms which are presented preferred, it being understood, however, that the invention is not limited to the precise arrangements and instrumentalities shown.

DETAILED DESCRIPTION OF THE INVENTION

Figure 1:
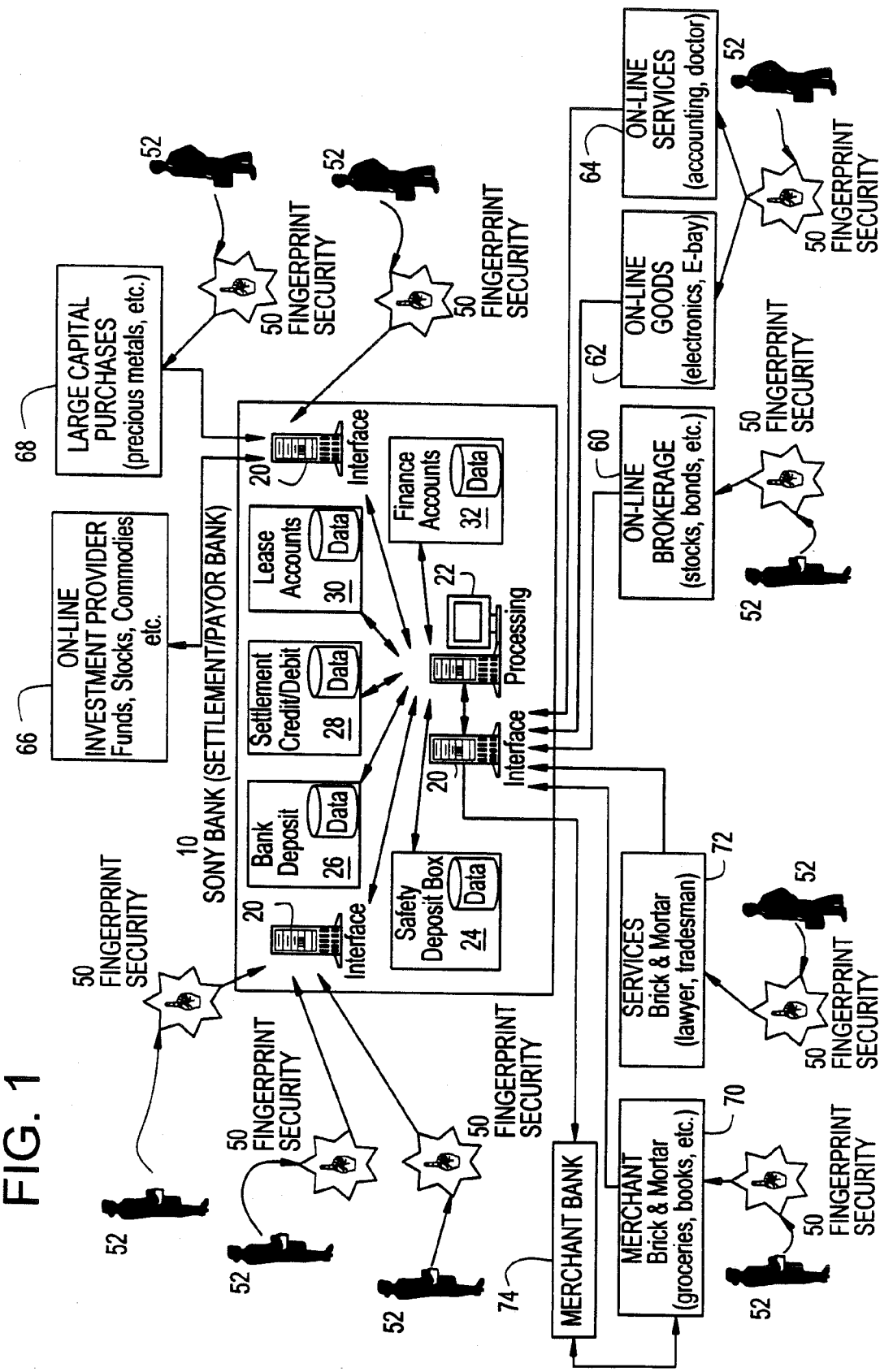
FIG. 1 is a block diagram illustrating a preferred system for carrying out the invention.

Reference is now made to FIG. 1 which illustrates a block diagram of a system suitable for carrying out the present invention. The system preferably includes a bank 10, such as a payor bank, settlement bank, originating bank, etc. The payor bank 10 preferably includes a processing unit 22 (such as a central computer, distributed computer, networked computer, etc.) in communication with one or more interface units 20 (for example, network interfaces, wireless interfaces, network servers, etc.). The processing unit 22 is also in communication with a plurality of back office and/or electronic functional units, including, for example, one or more electronic safety deposit boxes 24, bank accounts 26, settlement credit/debit accounts 28, lease accounts 30, and finance accounts 32. Each of the functional units preferably includes one or more databases containing information concerning the accounts thereof and the customers utilizing them.

Preferably, the payor bank 10 issues a plurality of fingerprint identification devices 50 to a plurality of customers 52. The fingerprint identification devices 50 may take any of a number of forms, e.g., a card, a smart card, a cellular phone, and a universal serial bus stick. It is preferred that each fingerprint identification device 50 is associated with one or more of the functional accounts of the payor bank 10. For example, the payor bank 10 may issue a fingerprint identification device 50 to a customer 52 which is associated with a bank account 26. That customer 52 may be issued another fingerprint identification device 50 associated with an electronic safety deposit box 24. It is understood, however, that the payor bank 10 may issue a single fingerprint identification device 50 which is associated with both the bank account 26 and electronic safety deposit box 24 (and any other functional account) without departing from the scope of the invention.

Figure 2:
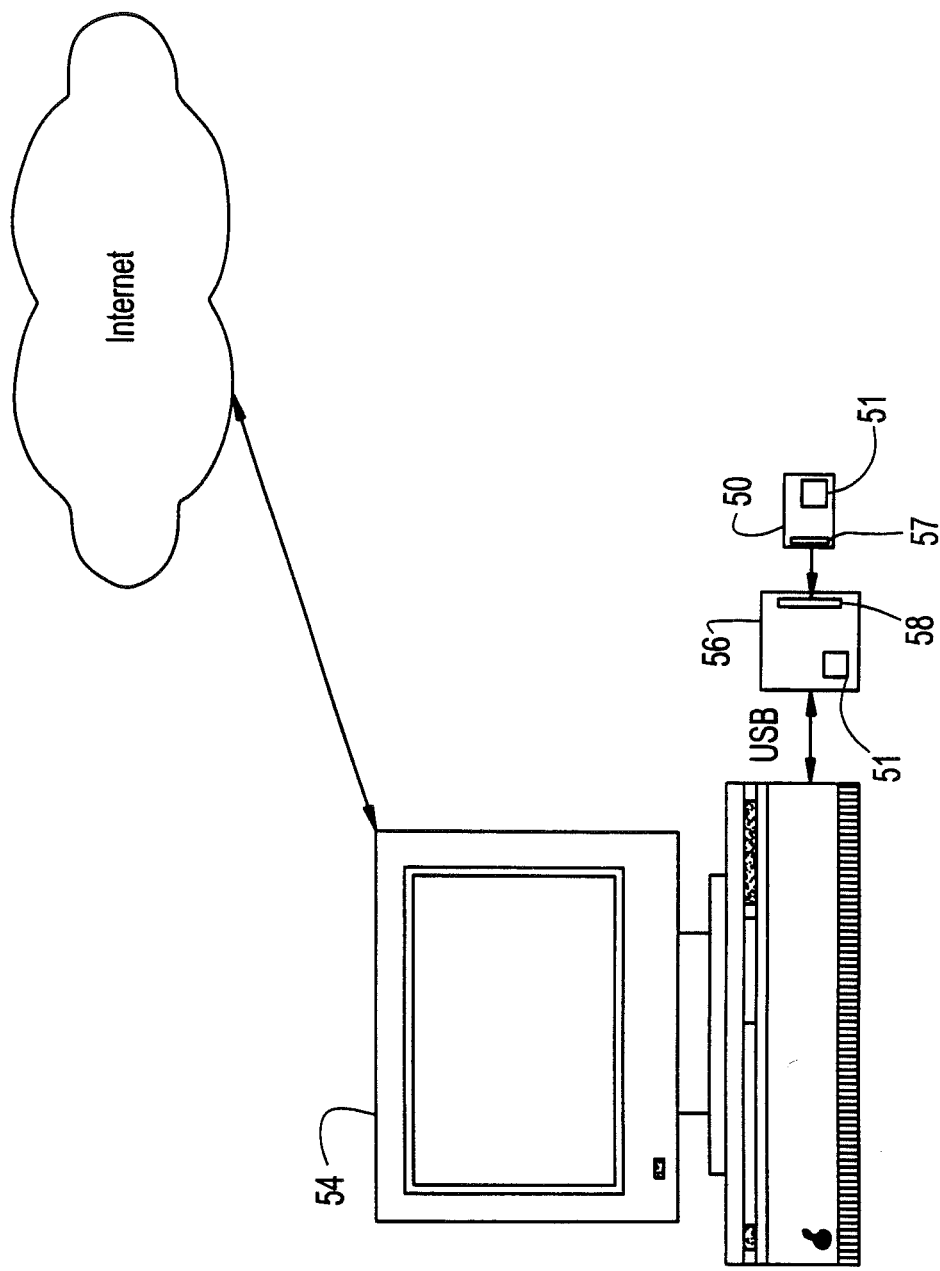
FIG. 2 is a schematic diagram of a fingerprint identification device which is connectable to a computer in accordance with the present invention.

With reference to FIG. 2, the fingerprint identification device 50 is preferably in the form of a card or thin box which contains information about the owner of the device, the payor bank, the functional account number, etc. The fingerprint identification device 50 includes a microprocessor, memory, and fingerprint sensor 51 which are interconnected and programmed in order to compare a fingerprint of the customer 52 with a stored fingerprint of that customer 52. The card issues an authorization code only when the fingerprint of the customer 52 matches the stored fingerprint. Those skilled in the art will appreciate that any of the known hardware suitable to implement the fingerprint identification device 50 may be employed, such as that disclosed in U.S. patent application Ser. No. 09/466,965, entitled AUTHENTICATION SYSTEM, FINGERPRINT IDENTIFICATION UNIT, AND AUTHENTICATION METHOD, the entire disclosure of which is hereby incorporated by reference.

It is most preferred that the stored fingerprint and other information regarding the customer 52 are in encrypted form (e.g., using known PKI technology) and that this encrypted information remain encrypted when transmitted from the device 50 to any other device. It is preferred that the fingerprint identification device 50 is connectable to a computer 54 (such as a PC) through an interface 56. The fingerprint identification device 50 may include a connector 57 which is matable with a corresponding connector 58 on the interface 56. The interface 56 preferably receives information from the fingerprint identification device 50 through the connectors 57, 58 and transfers at least some of this information to the PC 54 by way of the universal serial bus (USB) interface.

Alternatively, the device 50 may include an integral interface for connecting to the computer 54 by way of the universal serial bus (USB). Thus, the information on the fingerprint identification device 50 may be transmitted over a network (e.g., the Internet) from the computer 54, preferably in encrypted form (e.g., using API data transfer, PKS 11).

Most preferably, the fingerprint identification device 50 is a small, stand alone unit (e.g., measuring about 8.5 cm×5.4 cm×0.9 cm and weighting about 35 grams). It is most preferred that the fingerprint sensor 51 include a matrix of pixels formed in a semiconductor chip, a 128×192 matrix of pixels being preferred. Any of the known fingerprint matching algorithms may be employed, such as pattern matching. See, for example, U.S. Pat. No. 4,582,985, entitled DATA CARRIER, the entire disclosure of which is hereby incorporated by reference.

In an alternative embodiment, the fingerprint identification device may be integral with the interface 56 or the interface 56 may contain separate fingerprint identification circuitry (including sensor 51) such that the device 50 is not required to execute fingerprint recognition and matching. In another alternative embodiment of the invention, the computer 54 may contain fingerprint identification circuitry (including sensor 51) integrally disposed therein such that neither the device 50 nor the interface 56 is required to execute fingerprint recognition and matching.

Referring to FIG. 1, any of the customers 52 may conduct transactions with one or more providers of goods and/or services, such as on-line brokerages 60, on-line goods providers 62, on-line services service providers 64, on-line investment account providers 66, providers of large capital purchases 68, brick and mortar merchants 70 or brick and mortar service providers 72.

Figure 3:
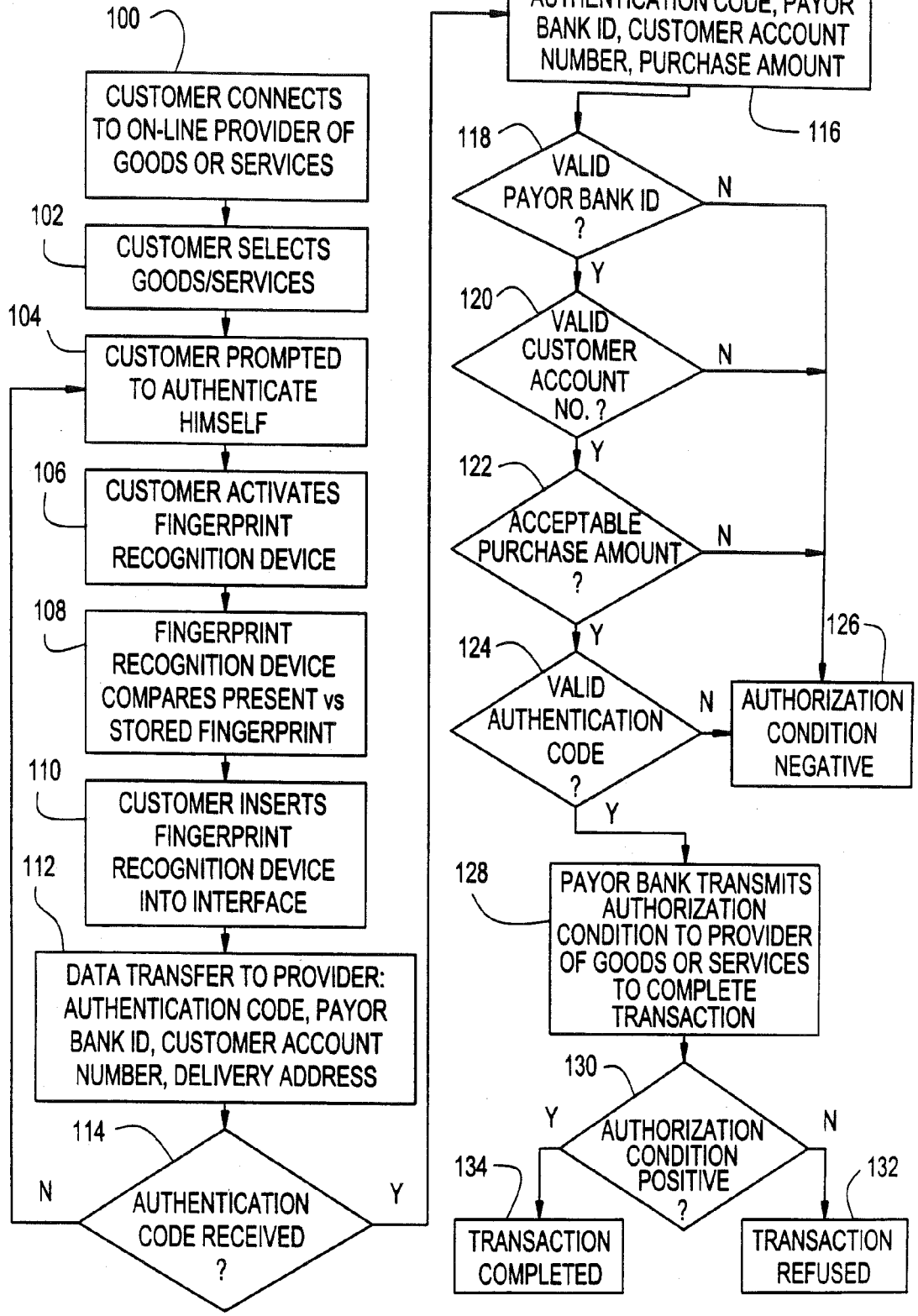
FIG. 3 is a flow diagram illustrating process steps for authorizing a transaction between a consumer and a provider of goods and/or services over a network in accordance with one aspect of the invention.

Reference is now made to FIG. 3 which is a flow diagram illustrating process steps which are preferably carried out in accordance with the invention. In particular, the process steps illustrated in FIG. 3 relate to a commercial transaction conducted over a network (such as the Internet) between a customer 52 and an on-line provider of goods and/or services, such as the on-line brokerage 60, the on-line goods provider 62, or the on-line services provider 64.

At action 100, the customer 52 connects to the on-line provider of goods and/or services 60, 62 or 64 by way of the network in a manner well known to those skilled in the art. For example, the customer 52 may utilize a personal computer (PC) 54 (FIG. 2) to execute a browser program operable to electronically connect to a website of the provider of goods and/or services. Using the browser program, the customer 52 may view the goods and/or services available from the provider 60, 62 or 64 and select particular goods or services for one or more transactions (action 102).

At action 104, the provider of goods and/or services prompts the customer 52 to authenticate himself or herself as being authorized to use a particular mode for making remittance, for example, debiting a demand deposit account (DDA), debiting a credit card account, etc. In particular, the provider of goods and/or services prompts the customer 52 to authenticate himself by activating the fingerprint identification device 50.

At action 106, the customer 52 activates the fingerprint identification device 50 in a manner consistent with known techniques such that the fingerprint identification device compares the customer's fingerprint with a stored fingerprint (action 108) and produces an authorization code indicating that a match exists between the customer's fingerprint and the stored fingerprint. At action 110, the customer 52 inserts the fingerprint identification device 50 into an interface device 56 (FIG. 2). The customer 52 may alternatively authenticate himself by activating fingerprint identification circuitry in the interface 56 or in the computer 54. Whichever technique is employed, the customer 52 preferably uses the personal computer 54 to access the Internet. Data transfer is then conducted between the fingerprint identification device 50 (or other fingerprint identification circuitry if employed) and the provider of goods and/or services 60, 62 or 64 (action 112). The data transfer preferably includes at least one of the authentication code, payor bank identification number, customer account number, and delivery address. Most preferably, the data of this transfer are in encrypted form.

At action 114, if the customer 52 fails to transfer the authentication code to the provider of goods and/or services 60, 62 or 64, then it is preferred that the provider of goods and/or services rejects the transaction and again requests that the customer authenticate himself (action 104). When at least the authentication code is received by the provider of goods and/or services 60, 62 or 64, then the processing of the transaction is permitted to continue.

At action 116, the provider of good and/or services 60, 62 or 64 preferably transfers data to the payor bank 10, which data preferably includes at least one of the authentication code, payor bank identification number, customer account number, and purchase amount. It is most preferred that at least the authentication code be provided to the payor bank 10. The payor bank 10 then analyzes at least one of the payor bank identification number (action 118), the customer account number (action 120), the purchase amount (action 122) and the authorization code (124) to determine whether one or all of the data are valid. Most preferably, the payor bank 10 analyzes the authentication code (action 124) to verify its validity prior to authorizing the transaction. As illustrated, the queries at actions 118, 120, 122, and 124 are linked serially through the affirmative ("Y") branch of each. It is noted, however, that the queries of actions 118, 120, 122, and 124 may be linked in parallel without departing from the scope of the invention. It is intended that an affirmative determination at one or more of the queries of actions 118, 120, 122 and 124 tends to advance the process flow toward action 128. If, however, any one or more of the data are not valid and the queries at one or more of actions 118, 120, 122 and 124 are negative ("N"), then the payor bank 10 preferably establishes a negative authorization condition (action 126).

At action 128, the payor bank 10 preferably transmits the authorization condition to the provider of goods and/or services and the provider of goods and/or services determines whether the authorization condition is positive or negative (action 130). When the authorization condition is negative, the provider of goods and/or services refuses to complete the transaction (action 132). Conversely, when the authorization condition is positive, the provider of goods and/or services completes the transaction (action 134).

Those skilled in the art will appreciate that commercial transactions conducted at the point of sale, for example, at brick and mortar stores, 70, 72, may be carried out in accordance with the invention using the steps illustrated in FIG. 3 with the exception of those concerning the transmission of data from the customer 52 to the provider 60, 62 or 64 over the network. Instead, the data (e.g., at least one of the authentication code, payor bank identification number, customer account number, delivery address, etc.) would be provided to, for example, the merchant 70 and/or service provider 72 at the point of sale (action 112).

Figure 4:
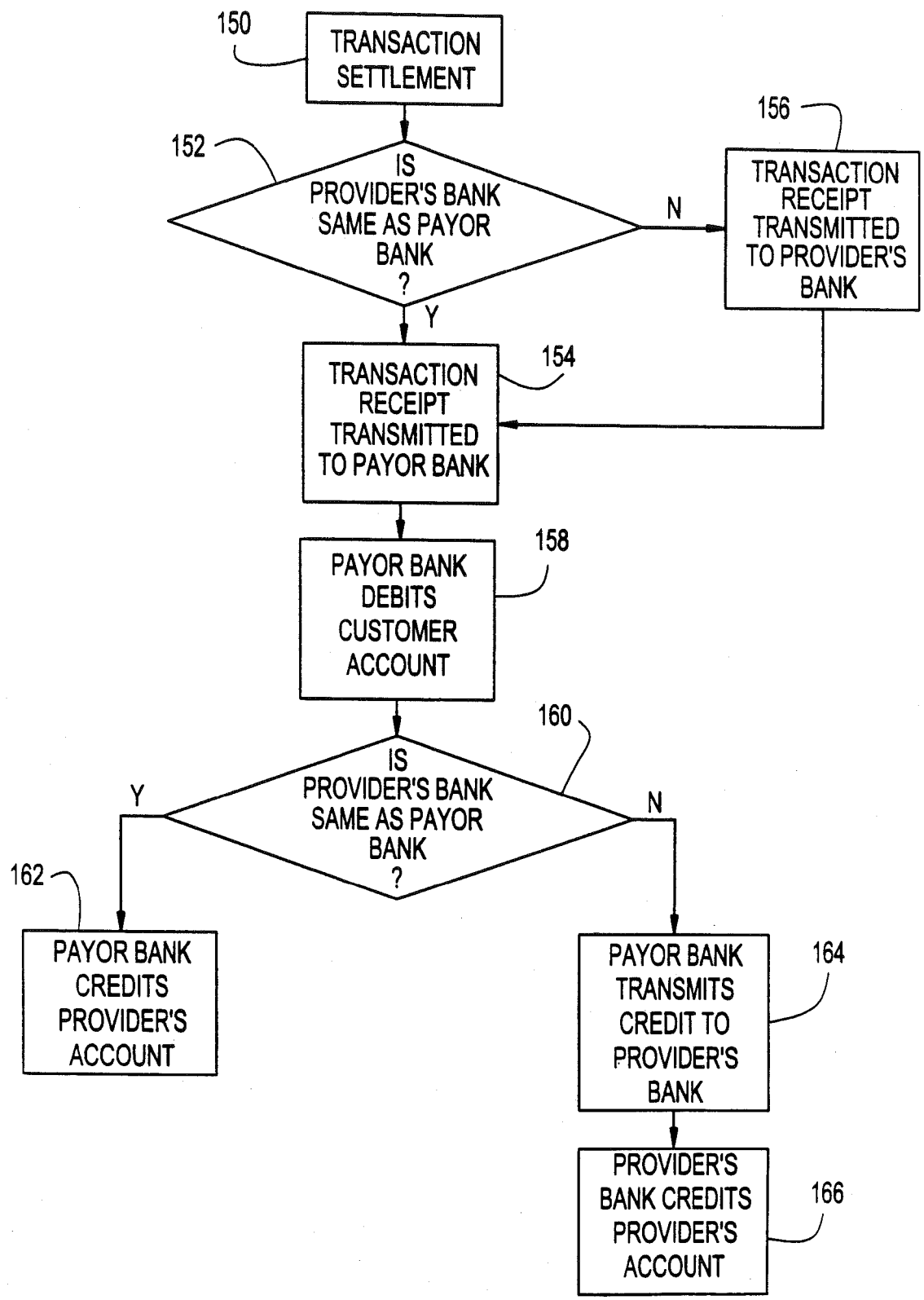
FIG. 4 is a flow diagram illustrating a settlement sequence following the transaction process of FIG. 3.

With reference to FIG. 4, once the commercial transaction has been completed (FIG. 3), the transaction is settled (action 150). Initially, a determination is made as to whether the provider of goods and/or services 70, 72 utilizes the payor bank 10 in settling its transactions (action 152). If it does, a transaction receipt is transmitted from the provider of goods and/or services 70, 72 to the payor bank 10. If not, then the provider of goods and/or services 70, 72 may settle the transaction through its own bank (e.g., a merchant bank 74) by transmitting the transaction receipt to that bank (action 156). The provider's bank would then transmit the transaction receipt to the payor bank 10 (action 154).

At action 158, the payor bank 10 debits the customer's account and at action 160, a determination is again made as to whether the provider of goods and/or services 70, 72 utilizes the same payor bank 10 as the customer 52. If it does, the payor bank 10 directly credits the bank account of the provider of goods and/or services (action 162). If not, the payor bank 10 transmits a credit to the bank of the provider of goods and/or services (action 164) and that bank credits the provider's bank account (action 166).

Figure 5:
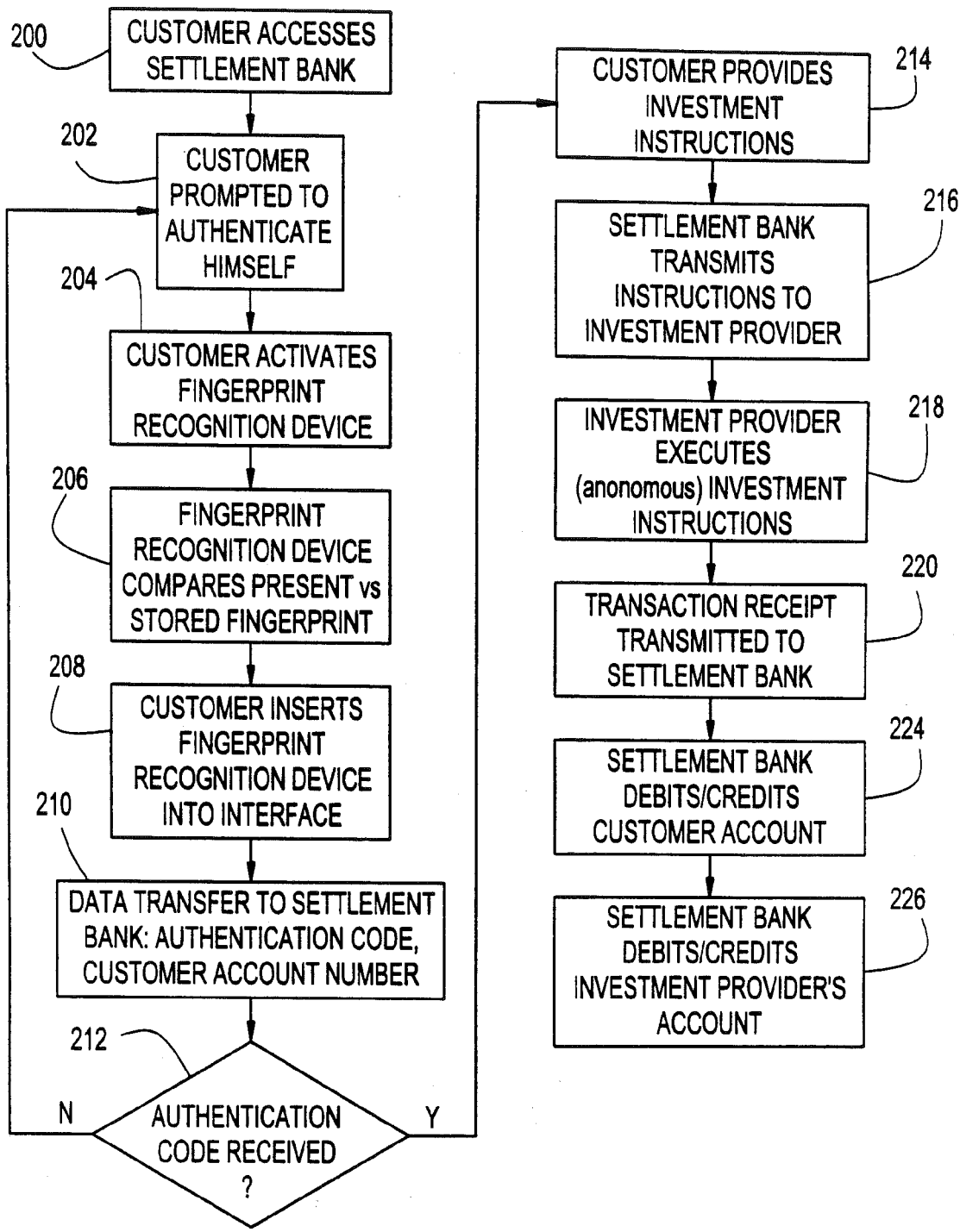
FIG. 5 is a flow diagram illustrating process steps for facilitating an investment transaction over a network in accordance with another aspect of the present invention.

Reference is now made to FIG. 5 which is a flow diagram illustrating process steps in accordance with another aspect of the present invention. In particular, the process steps represent actions to be taken to facilitate an investment transaction between a customer 52 and an on-line investment service provider 66 (FIG. 1). In accordance with the invention, the on-line investment provider 66 may be an investment bank, a brokerage, etc., and may be located domestically or off-shore. Preferably, the investment transaction is conducted through the settlement bank 10 (the term settlement being used to indicate that the customer's bank account within the settlement bank 10 may be debited or credited depending on the investment transaction).

At action 200, the customer 52 preferably accesses the settlement bank 10 via a network, such as the Internet, using any of the known techniques. After the customer 52 has indicated that he or she is interested in conducting an investment transaction, the settlement bank 10 prompts the customer 52 to authenticate himself or herself (action 202). In response, the customer 52 preferably activates the fingerprint identification device 50 (action 204) which causes the device to compare the customer's fingerprint with a stored fingerprint (action 206) and produce an authentication code if a match is obtained.

At action 208, the customer preferably inserts the fingerprint identification device 50 into an interface 56 (FIG. 2) suitable for transmitting data between the fingerprint identification device 50 and the settlement bank 10, for example, via the universal serial bus of the computer 54. Alternatively, the customer 52 may authenticate himself or herself by activating fingerprint identification circuitry in the interface 56 or in the computer 54. Whichever technique is employed, the customer 52 preferably uses the computer 54 to access the Internet. At action 210, data is preferably transmitted from the fingerprint identification device 50 (or other fingerprint identification circuit if employed) to the settlement bank 10, the data including at least one of the authentication code and the customer investment account number (in encrypted form).

At action 212, if the settlement bank 10 receives the authentication code (and, if required, the investment account number), then the investment transaction is permitted to continue. If not, then the process flows back to action 202 where the customer 52 is again prompted to authenticate himself or herself.

At action 214, the customer 52 preferably provides investment instructions to the settlement bank 10 over the network, such as "buy 100 shares of xyz corporation" and, at action 216, the settlement bank 10 transmits the instructions to the on-line investment provider 66 (e.g., an investment bank). It is noted that the investment instructions may be transmitted to the on-line investment provider 66 in a way which maintains the customer's anonymity. Indeed, the customer's name, account number, etc., need not be transmitted to the investment provider 66. The customer 52, however, may instruct the settlement bank 10 as to whether or not he or she wishes to maintain such anonymity.

At action 218, the on-line investment provider 66 executes the investment instructions and does not require authorization because, by previous agreement, the receipt of investment instructions from the settlement bank 10 itself is authorization enough. At action 220, a transaction receipt is transmitted to the settlement bank 10 indicating whether remittance is required or payment is being made. At action 224, the settlement bank 10 credits or debits the customer's investment account in accordance with the transaction receipt and, at action 226, the settlement bank 10 debits and/or credits the on-line investment provider's 66 account.

Figure 6:
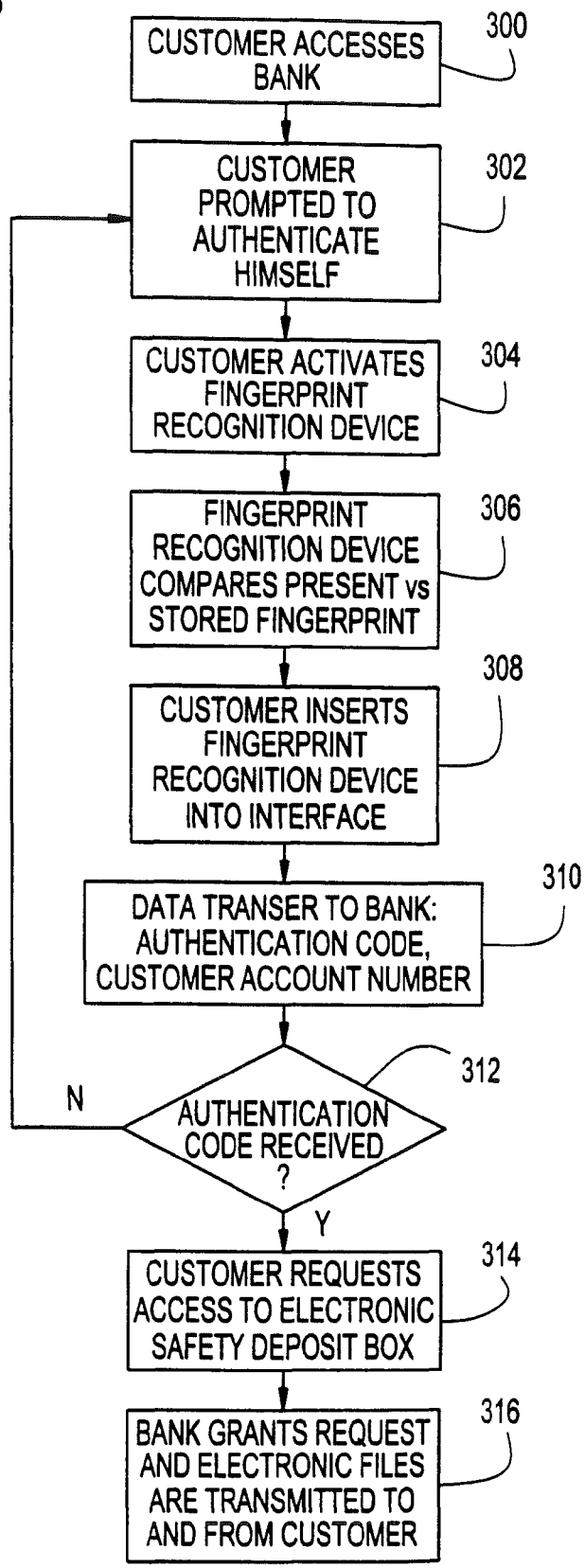
FIG. 6 is a flow diagram illustrating process steps for facilitating access to an electronic account, such as an electronic safety deposit box, in accordance with another aspect of the present invention.

Reference is now made to FIG. 6 which is a flow diagram illustrating process steps in accordance with yet another aspect of the present invention. In particular, the process steps represent actions to be taken to facilitate access an electronic account within the payor bank 10. Preferably, the electronic bank account is an electronic safety deposit box 24, it being understood that any of the functional accounts (e.g., bank deposit account 26, credit/debit account 28, lease account 30, finance account 32, etc.) may be accessed in a similar way. At action 300, the customer 52 preferably accesses the payor bank 10 via the network using any of the known techniques. After the customer 52 has indicated that he or she is interested in accessing an electronic account (such as an electronic safety deposit box 24), the payor bank 10 then prompts the customer 52 to authenticate himself or herself (action 302). In response, the customer 52 preferably activates the fingerprint identification device 50 (action 304) which causes the device to compare the customer's fingerprint with a stored fingerprint (action 306) and produce an authentication code if a match is obtained.

At action 308, the customer preferably inserts the fingerprint identification device 50 into an interface 56 (FIG. 2) suitable for transmitting data between the fingerprint identification device 50 and the payor bank 10, for example, via the universal serial bus of the computer 54. Alternatively, the customer 52 may authenticate himself or herself by activating fingerprint identification circuitry in the interface 56 or in the computer 54. Whichever technique is employed, the customer 52 preferably uses the computer 54 to access the Internet. At action 310, data is preferably transmitted from the fingerprint identification device 50 (or other fingerprint identification device if employed) to the payor bank 10 (in encrypted form), the data including at least one of the authentication code and the number of the electronic account.

At action 312, if the payor bank 10 receives the authentication code (and, if required, the account number), then the access process continues. If not, the process flows back to action 302 where the customer 52 is again prompted to authenticate himself or herself. At action 314, the customer 52 may again request access to the electronic account, e.g., the electronic safety deposit box 24, and, at action 316, the payor bank 10 grants the customer's request and permits the customer 52 to manipulate, receive, and/or transmit electronic file(s) to the account. Those skilled in the art will appreciate that the files contained in an electronic safety deposit box 24 may include will(s), codicil(s), title to securities or other property, contract(s), certificate(s), insurance policies, etc. These files are represented by the "database" shown in the electronic safety deposit box 24 shown in FIG. 1.

Advantageously, the method and system of the present invention readily provides for authorizing transactions over a network in which all parties to the transaction maintain confidence that the initiator (e.g., the customer) of the transaction is authorized to enter into the transaction. The transactions are not limited to commercial transactions for goods/services, but may include investment transactions, and access to electronic bank accounts, such as electronic safety deposit boxes 24, bank deposit accounts 26, settlement credit/debit accounts 28, etc.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A method comprising:
    storing an encrypted fingerprint in a fingerprint authentication device for authenticating a user's fingerprint, the fingerprint authentication device comprising a memory for the stored encrypted fingerprint and a processor for comparing the stored fingerprint with a scanned fingerprint, the stored encrypted fingerprint remaining in the fingerprint authentication device in order to perform subsequent authentications in the fingerprint authentication device;
    performing a comparison of the stored fingerprint and a scanned fingerprint in the fingerprint authentication device;
    generating authentication information using the fingerprint authentication device when the user's fingerprint matches the fingerprint stored in the fingerprint authentication device;
    transmitting the authentication information to a managing entity;
    authenticating a user of the fingerprint authentication device based upon at least the authentication information;
    transmitting an authentication to at least one provider of goods or services; and in response to the authentication being valid, accessing the at least one provider of goods or services.

2. The method of claim 1 wherein the authentication information includes an authentication code.

3. The method of claim 2 wherein the authentication code is encrypted.

4. The method of claim 1 further comprising:
    conducting a transaction if the authentication information is valid.

5. The method of claim 1 further comprising:
    receiving a request for authentication from the at least one provider of goods or services.

6. The method of claim 1 wherein the authentication information is encrypted.

7. The method of claim 1 further comprising:
    initiating a connection to the at least one provider of goods or services using an interface device.

8. A system comprising:
    a fingerprint authentication device having an encrypted fingerprint stored therein for checking a user's fingerprint and for generating authentication information if a fingerprint of a user of the fingerprint authentication device matches a fingerprint stored within the fingerprint authentication device, the fingerprint authentication device comprising a memory for the stored encrypted fingerprint and with a processor to compare the stored fingerprint with a scanned fingerprint, the stored fingerprint remaining in the fingerprint authentication device in order to perform subsequent matches in the fingerprint authentication device;
    a managing entity device to receive the authentication information, the managing entity device authenticates a user of the fingerprint authentication device based upon the authentication information; and
    at least one provider of goods or services to receive an authentication from the managing entity, wherein the user of the fingerprint authentication device accesses the at least one provider of goods or services if the authentication is valid.

9. The system of claim 8 wherein the authentication information includes an authentication code.

10. The system of claim 8 wherein the user of the fingerprint authentication device conducts a transaction if the authentication information is valid.

11. The system of claim 8 wherein the fingerprint authentication device receives a request for authentication from the at least one provider of goods or services.

12. The system of claim 8 wherein the authentication information is encrypted.

13. The system of claim 8 wherein the fingerprint authentication device initiates a connection to the at least one provider of goods or services using an interface device.

* * * * *